United States Patent
Neuhaus et al.

(10) Patent No.: US 11,292,518 B2
(45) Date of Patent: Apr. 5, 2022

(54) ABSOLUTE STEERING ANGLE SENSOR ASSEMBLY

(71) Applicant: Kelsey-Hayes Company, Livonia, MI (US)

(72) Inventors: Richard A. Neuhaus, Farmington Hills, MI (US); Vidya Sagar R. Mote, Farmington Hills, MI (US)

(73) Assignee: KELSEY-HAYES COMPANY, Livonia, MI (US)

( * ) Notice: Subject to any disclaimer, the term of this patent is extended or adjusted under 35 U.S.C. 154(b) by 22 days.

(21) Appl. No.: 16/105,011

(22) Filed: Aug. 20, 2018

(65) Prior Publication Data

US 2019/0248413 A1  Aug. 15, 2019

Related U.S. Application Data

(60) Provisional application No. 62/547,481, filed on Aug. 18, 2017.

(51) Int. Cl.
*B62D 15/02* (2006.01)
*B62D 5/04* (2006.01)
(Continued)

(52) U.S. Cl.
CPC ..... *B62D 15/0215* (2013.01); *B62D 15/0245* (2013.01); *G01B 7/30* (2013.01); *G01D 5/04* (2013.01)

(58) Field of Classification Search
CPC .. B62D 15/0215; B62D 15/02; B62D 15/022; B62D 15/021; B62D 5/04; G01D 5/04; G01B 7/30
See application file for complete search history.

(56) References Cited

U.S. PATENT DOCUMENTS

| 4,284,028 A | * | 8/1981 | Swanburg | G01P 1/04 |
| | | | | 116/62.2 |
| 6,909,282 B2 | * | 6/2005 | Onishi | B62D 15/0215 |
| | | | | 324/207.23 |

(Continued)

FOREIGN PATENT DOCUMENTS

| EP | 1342647 A2 | 10/2003 |
| EP | 1477389 A2 | 3/2004 |

(Continued)

OTHER PUBLICATIONS

EP Search Report, Application No. 18189509.5, dated Jan. 14, 2019.

*Primary Examiner* — Neel D Shah
(74) *Attorney, Agent, or Firm* — McNees Wallace & Nurick LLC

(57) ABSTRACT

An absolute steering angle sensor includes a single main gear having first gear teeth with a first pitch, second gear teeth with a second pitch, wherein the first and second gear pitches are different. A first magnet gear is driven by the first gear teeth, wherein the first magnet gear has a first gear profile and a first diameter. A second magnet gear is driven by the second gear teeth, wherein the second magnet gear has a second gear profile and a second diameter. The first and second gear profiles are different, and the first and second diameters are different. A first magnet rotates with the first magnet gear and emits a first magnetic field, and a second magnet rotates with the second magnet gear and emits a second magnetic field. A sensor assembly measures strengths of the first and second magnetic fields and calculates an absolute steering angle.

1 Claim, 10 Drawing Sheets

(51) Int. Cl.
*G01D 5/04* (2006.01)
*G01B 7/30* (2006.01)

(56) References Cited

U.S. PATENT DOCUMENTS

| | | | | |
|---|---|---|---|---|
| 2003/0122542 | A1* | 7/2003 | Koga | B62D 15/02 |
| | | | | 324/207.21 |
| 2005/0171727 | A1* | 8/2005 | Sakabe | B62D 15/0215 |
| | | | | 702/151 |
| 2011/0309827 | A1* | 12/2011 | Ruebenhagen | G01D 5/04 |
| | | | | 324/207.25 |
| 2013/0181469 | A1* | 7/2013 | Williams | B25J 15/026 |
| | | | | 294/207 |
| 2015/0042321 | A1* | 2/2015 | Yazdani | G01D 5/006 |
| | | | | 324/207.18 |
| 2018/0127026 | A1* | 5/2018 | Kim | B62D 15/0215 |
| 2019/0047619 | A1* | 2/2019 | Toth | B62D 5/0463 |

FOREIGN PATENT DOCUMENTS

| | | | |
|---|---|---|---|
| JP | 2004279065 | A | 10/2004 |
| JP | 2009276239 | A | 11/2009 |
| JP | 2011257275 | A | 12/2011 |

* cited by examiner

US 11,292,518 B2

ABSOLUTE STEERING ANGLE SENSOR ASSEMBLY

BACKGROUND OF THE INVENTION

This invention relates in general to steering assemblies for vehicles and in particular to an improved structure for an absolute steering angle sensor assembly for use in such steering assemblies.

SUMMARY OF THE INVENTION

This invention relates to an improved absolute steering angle sensor assembly for use in a steering assembly of a vehicle and related components thereof.

According to one embodiment, an absolute steering angle sensor assembly includes a single main gear around a steering column that has first gear teeth with a first pitch and second gear teeth with a second pitch, wherein the first and second pitches are different.

An advantage of an embodiment is a lower operating speed that reduces audible noise generated by the absolute steering angle sensor assembly. An additional advantage of an embodiment is a more compact size of the absolute steering angle sensor assembly. Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
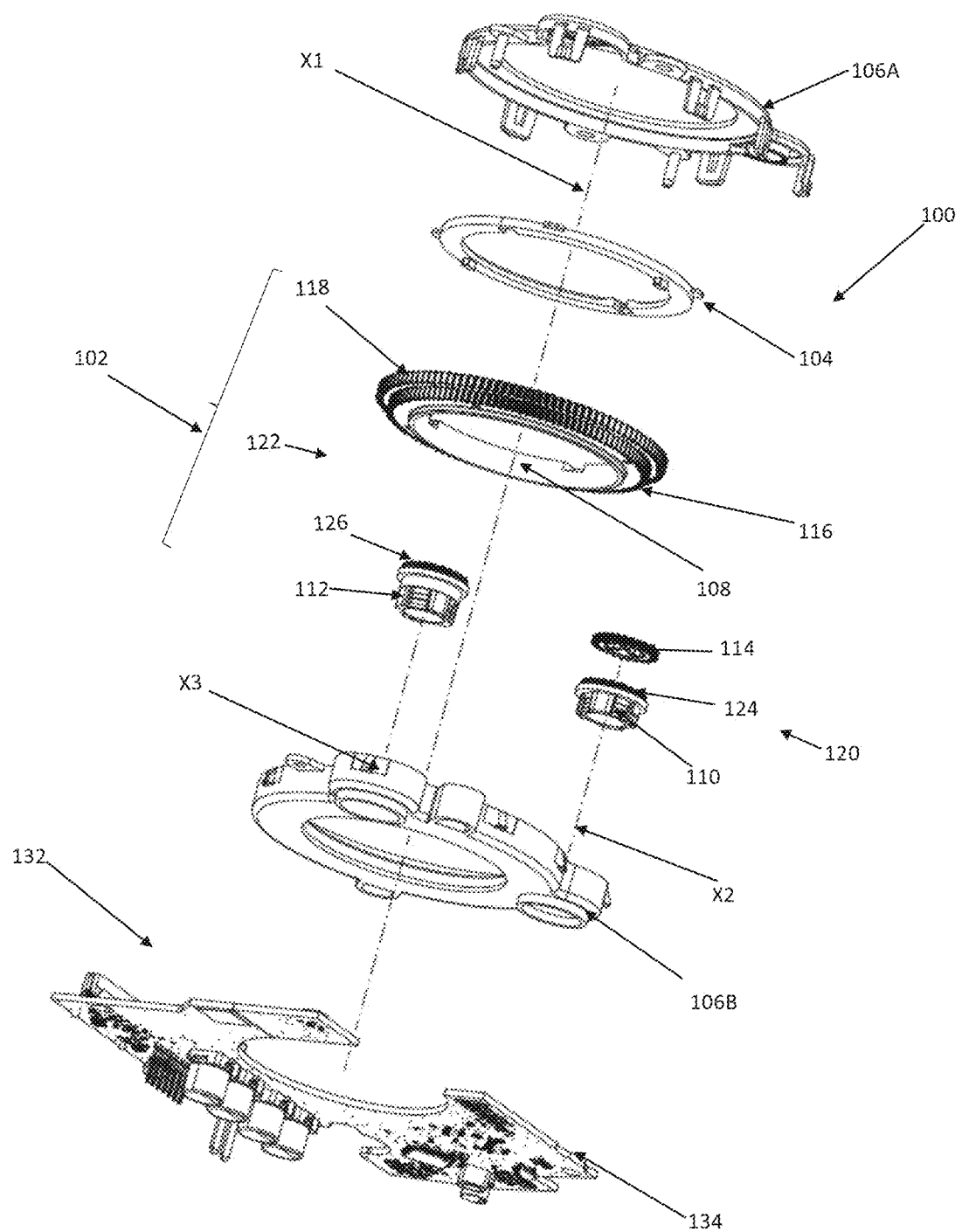
FIG. 1 is an exploded perspective view of an embodiment of an absolute steering angle sensor assembly for use in a steering assembly of a vehicle.
Figure 2:
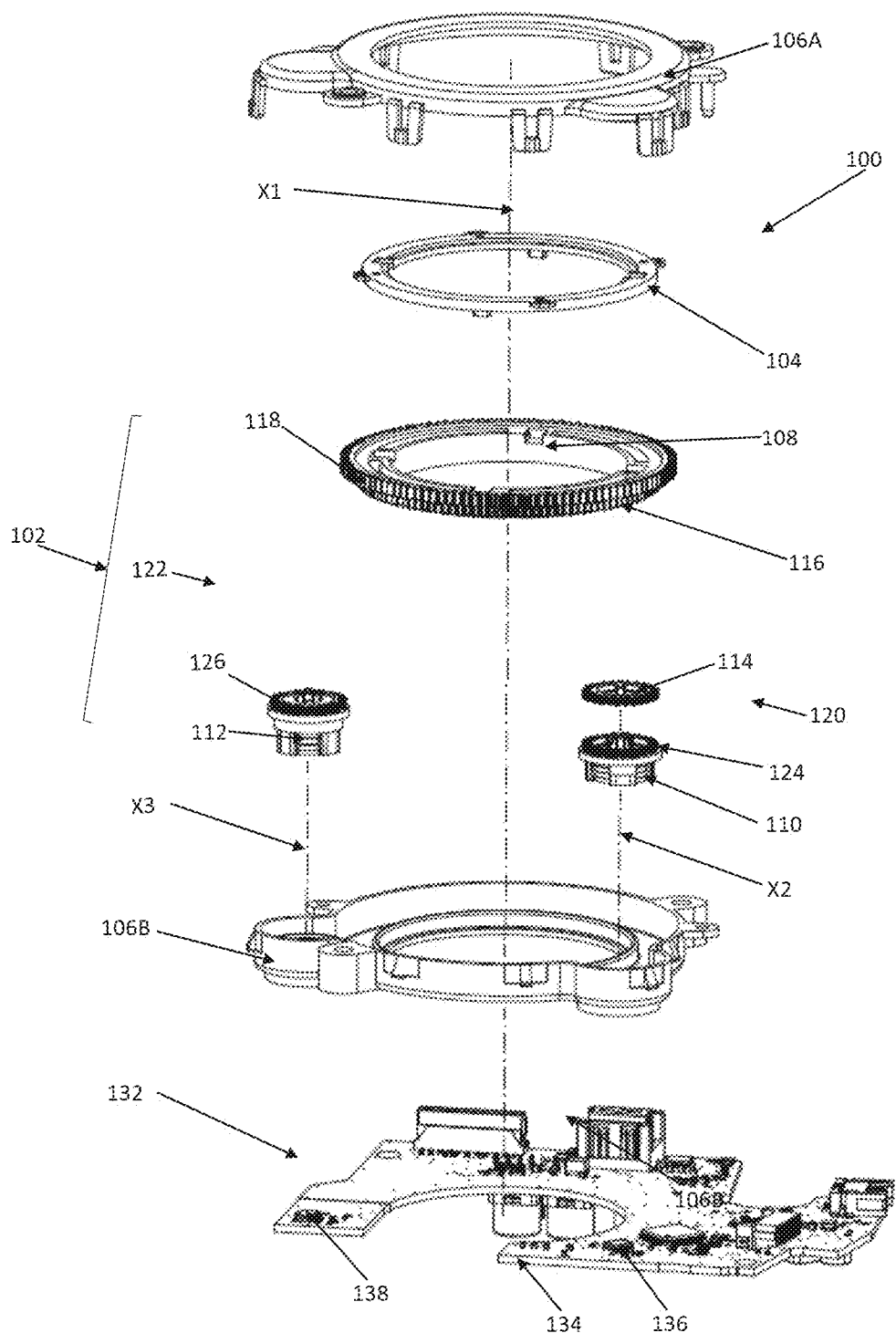
FIG. 2 is an additional exploded perspective view of the absolute steering angle sensor assembly of FIG. 1.
Figure 3:
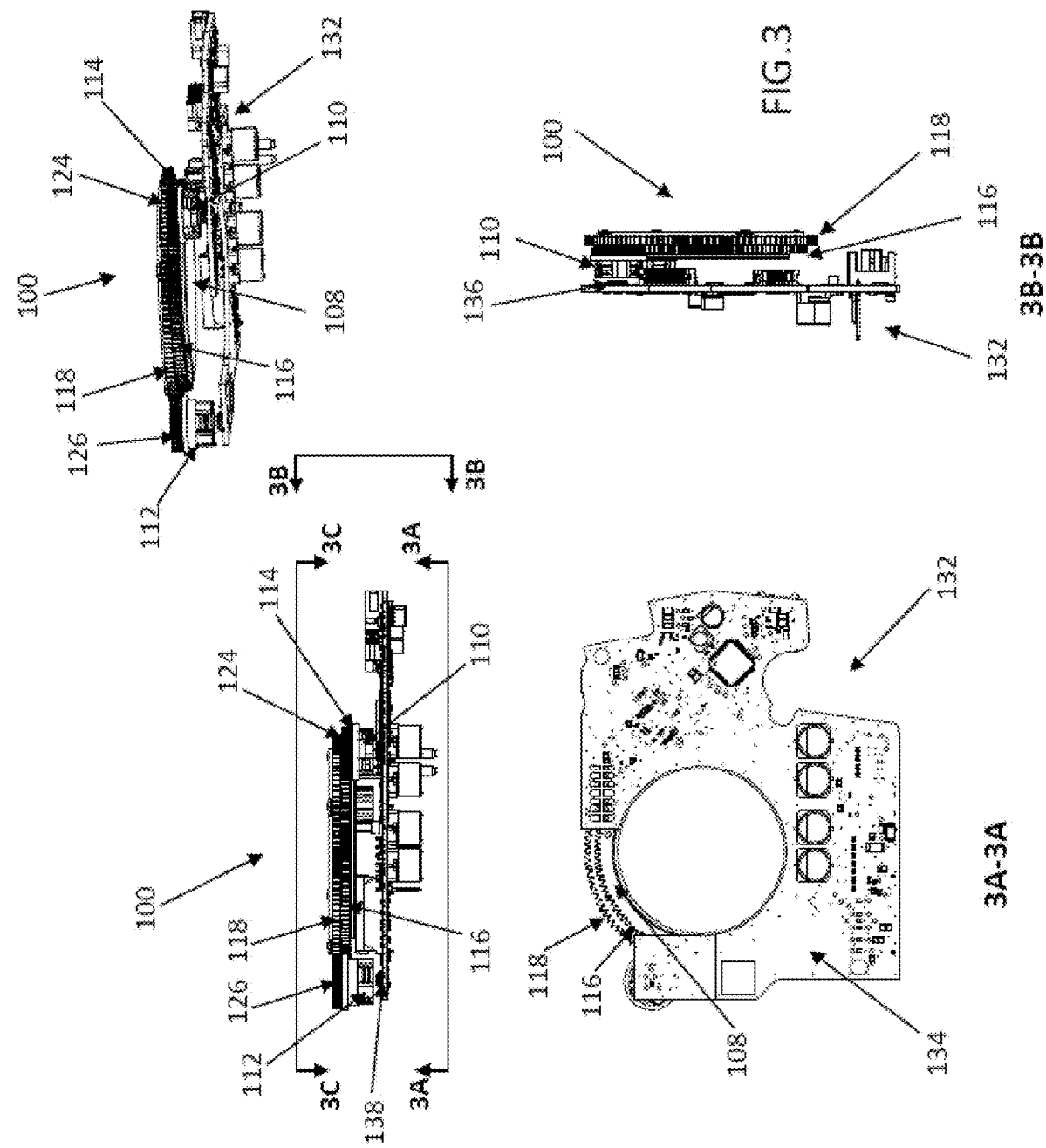
FIG. 3 is various perspective and elevation views of the absolute steering angle sensor assembly of FIG. 1.
Figure 4:
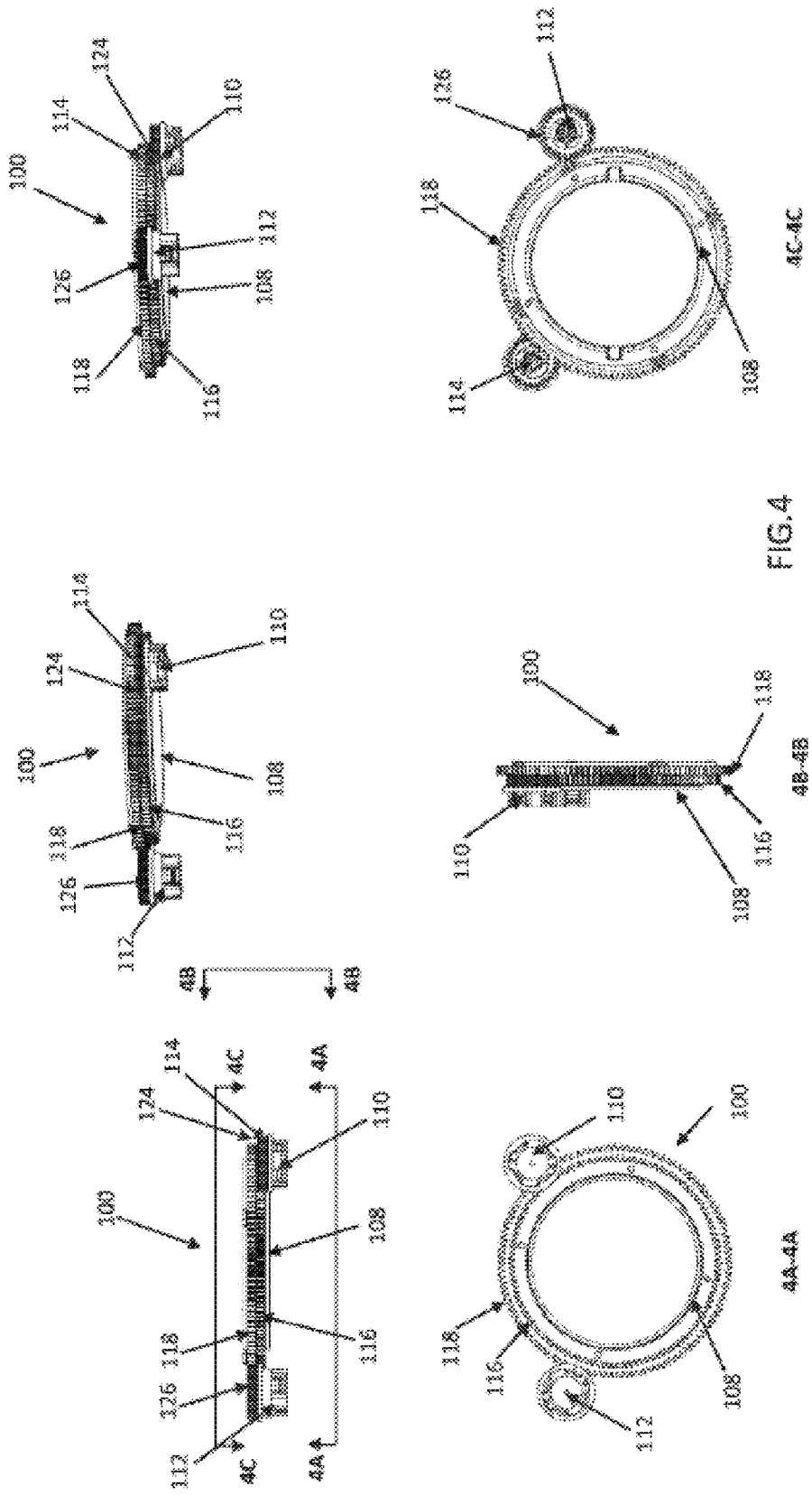
FIG. 4 is additional perspective and elevation views of the absolute steering angle sensor assembly of FIG. 1 with a sensor assembly omitted.
Figure 5:
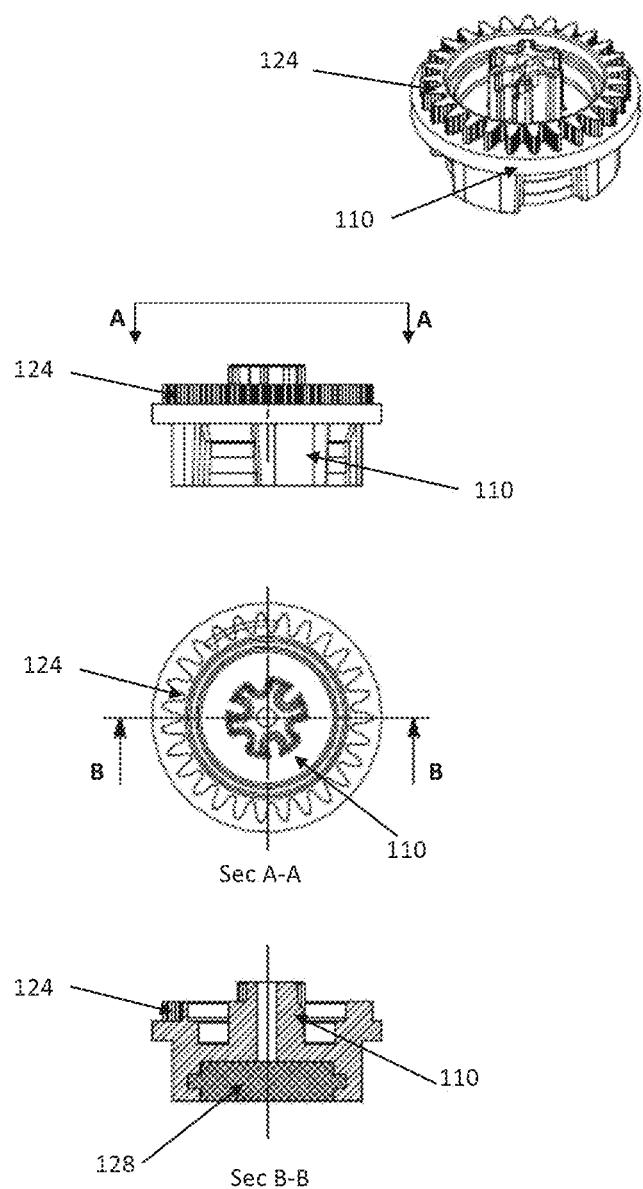
FIG. 5 is various views of a first magnet gear of the absolute steering angle sensor assembly of FIG. 1.
Figure 6:
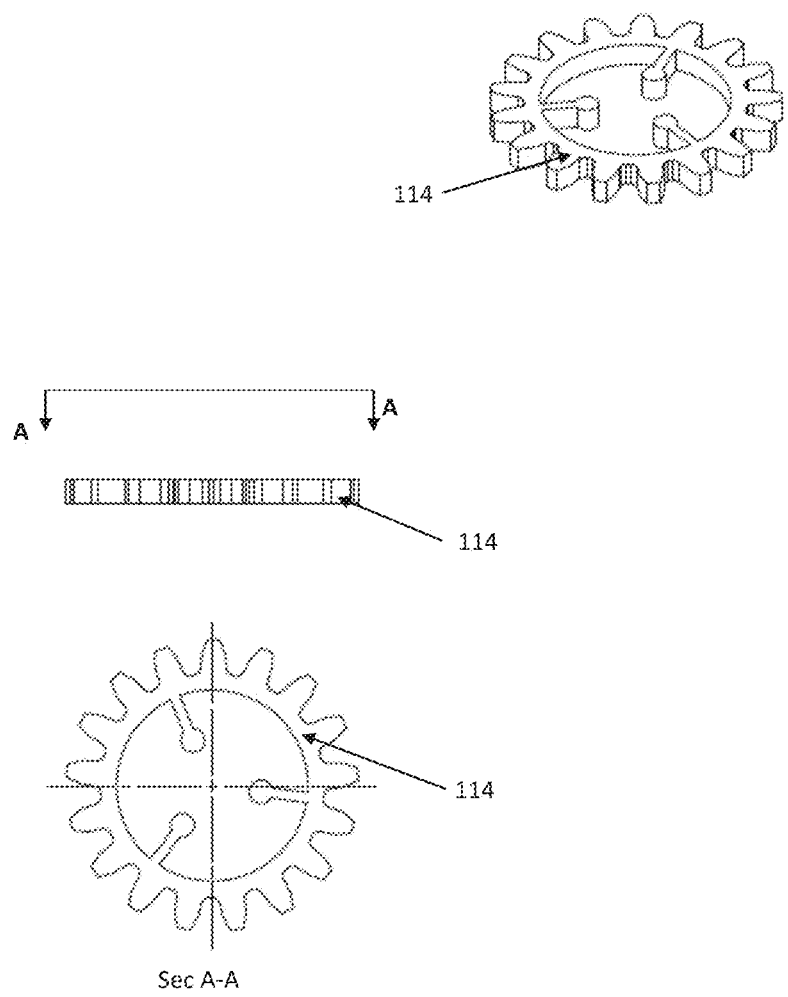
FIG. 6 is various views of an anti-back lash gear of the absolute steering angle sensor assembly of FIG. 1.
Figure 7:
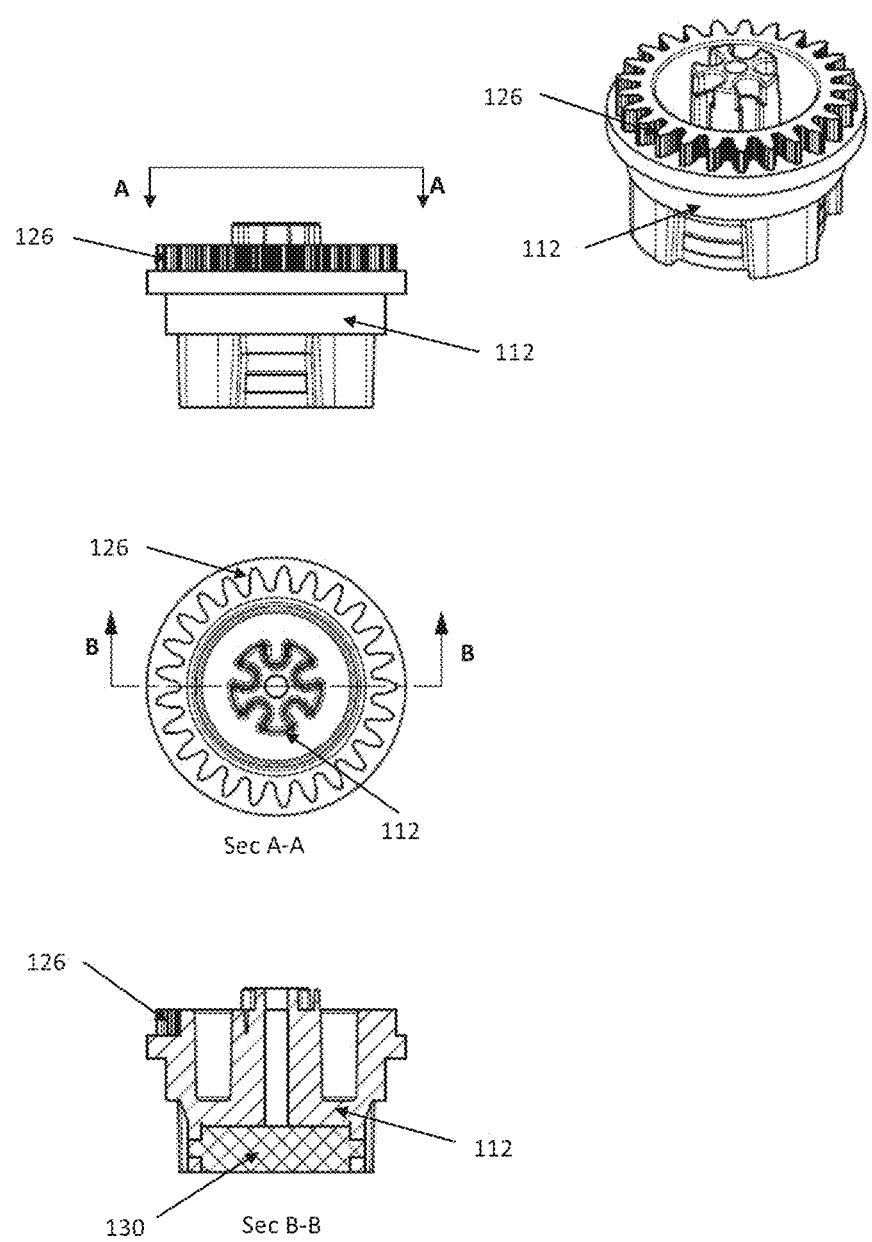
FIG. 7 is various views of a second magnet gear of the absolute steering angle sensor assembly of FIG. 1.
Figure 8:
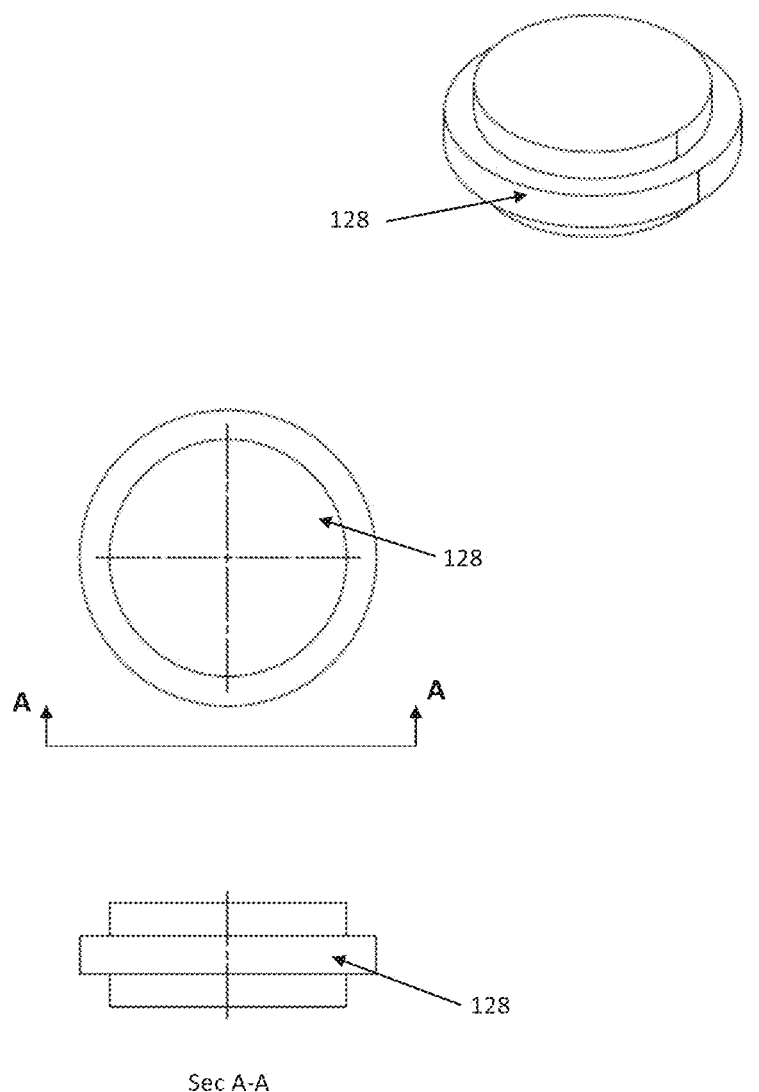
FIG. 8 is various views of a magnet of the absolute steering angle sensor assembly of FIG. 1.
Figure 9:
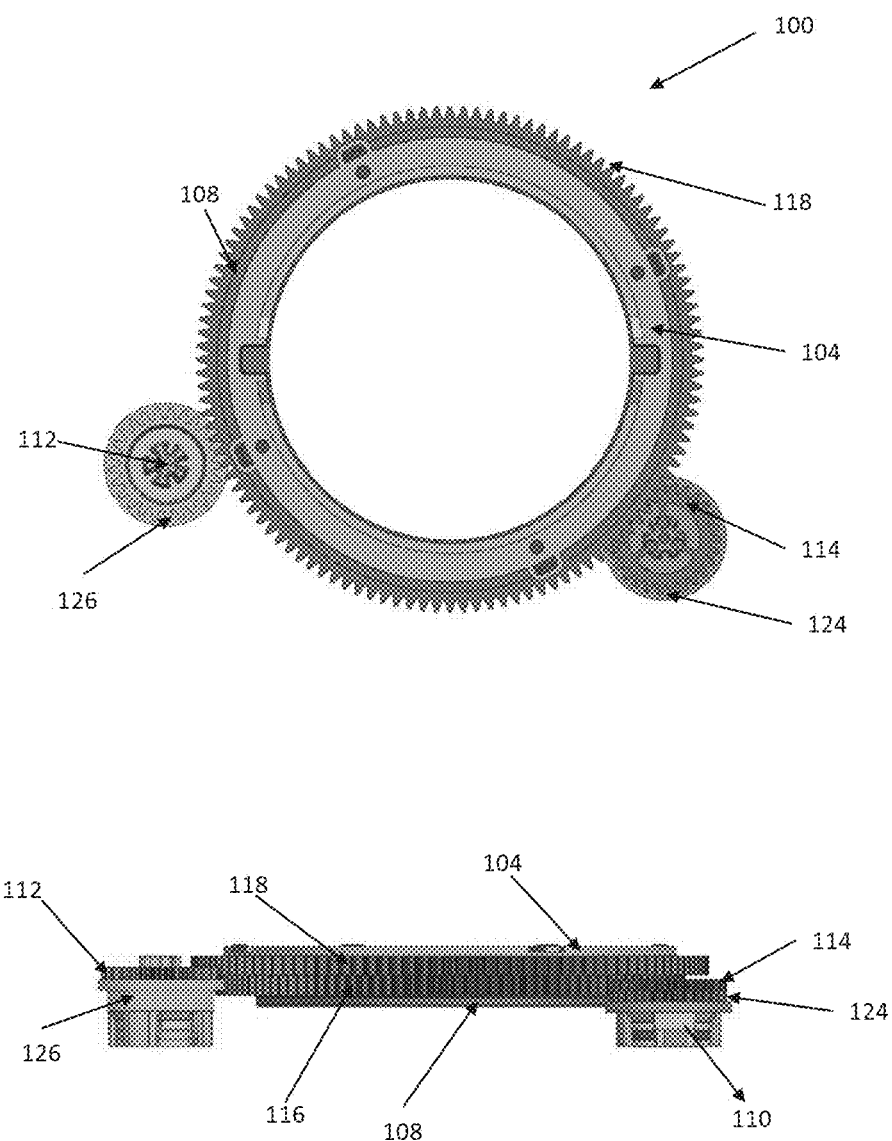
FIG. 9 is additional elevation views of the absolute steering angle sensor assembly of FIG. 1.
Figure 10:
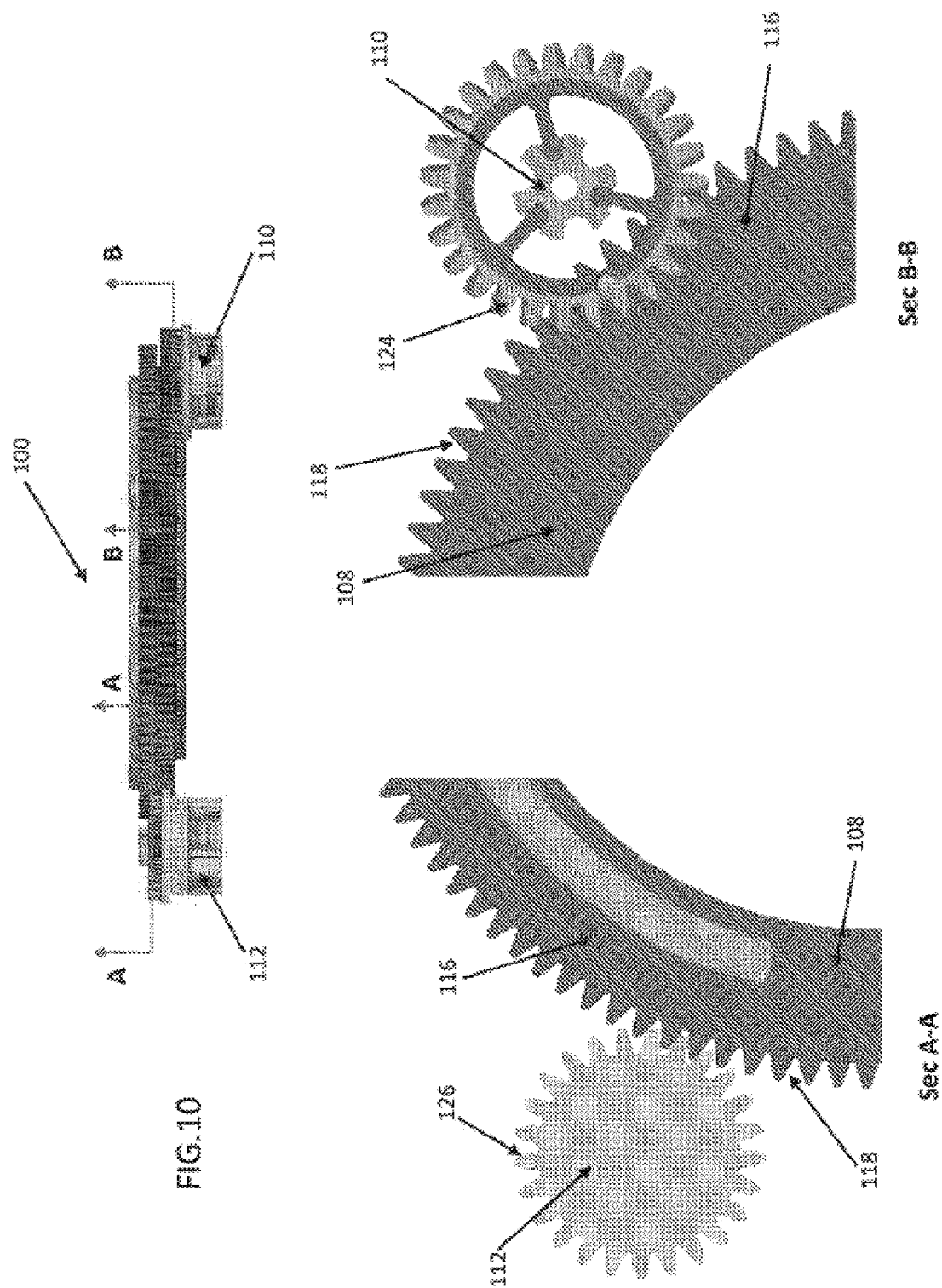
FIG. 10 is additional elevation views of the absolute steering angle sensor assembly of FIG. 1.

Referring now to FIGS. 1-10, there is illustrated an embodiment of an absolute steering angle sensor (ASAS) assembly, indicated generally at 100, for use with a steering assembly of a vehicle. The ASAS assembly 100 has gears, indicated generally at 102 and an adaptor 104. The gears 102 and adaptor 104 are housed within a housing. As illustrated, the housing is formed from first and second portions 106A and 106B, respectively, that are joined together.

The gears 102 include a main gear 108 on a steering axis X1 with the adaptor 104. The adaptor 104 is operatively connected with the main gear 108 such that rotation of the adaptor 104 also rotates the main gear 108. The adaptor 104 is also operatively connected around a steering column (not illustrated) such that rotation of the steering column also rotates the adaptor 104. For example, the adaptor 104 may be connected to the steering column by clockspring pins. The steering column extends along the steering column axis X1 and is also operatively connected to rotate with a steering wheel. As such, when a driver of the vehicle rotates the steering wheel, so too are the steering column, adaptor 104, and main gear 108 rotated.

The gears 102 also include first and second magnet gears 110 and 112, respectively. Each of the first and second magnet gears 110 and 112, respectively, is separately driven by the main gear 108. The first magnet gear 110 is on a first gear axis X2 and the second magnet gear 112 is on a second gear axis X3. The first magnet gear 110 has a first gear pitch diameter and the second magnet gear 112 has a second gear pitch diameter, wherein the first and second gear pitch diameters are different. Furthermore, the first magnet gear 110 and second magnet gear 112 have different diameters.

The gears 102 further include an anti-backlash (ABL) gear 114 to reduce free play between the main gear 108 and the first magnet gear 110 and improve accuracy of measurements made by the ASAS assembly 100. The ABL gear 114 is also on the first gear axis X2. ABL gear 14 is elastically biased relative to a gear teeth 124 described below in order to reduce the play between first magnet gear 110 and main gear 108.

The single main gear 108 has two separate sets of gear teeth: first gear teeth 116 and second gear teeth 118. The first and second gear teeth 116 and 118, respectively, have different gear modules and quantities of gear teeth. Preferably, the difference in teeth is 2. The main gear 108 has a first outside diameter at the first gear teeth 116 and a second outside diameter at the second gear teeth 118. The first and second outside diameters are different. As illustrated, the first outside diameter is less than the second outside diameter. Additionally, the first gear teeth 116 have a first pitch and the second gear teeth 118 have a second pitch, wherein the first and second pitches are different. This allows achieving a difference between the first outside diameter and the second outside diameter which is larger than due only to the difference in the number of teeth. This larger difference provides advantages during injection molding of single main gear 108.

The first gear teeth 116 of the main gear 108 and the first magnet gear 110 with the ABL gear 114 comprise a first gear set, indicated generally at 120. The first gear set 120 has a first gear profile. The second gear teeth 118 of the main gear 108 and the second magnet gear 112 comprise a second gear set 122. The second gear set 122 has a second gear profile that is different from the first gear profile. As such, sizes and quantities of gear teeth vary between the first and second gear sets 120 and 122, respectively.

The first magnet gear 110 has third gear teeth 124. The second magnet gear 112 has fourth gear teeth 126. The first gear teeth 116 mesh with the third gear teeth 124 such that the main gear 108 rotatably drives the first magnet gear 110. As illustrated, the first and third gear teeth 116 and 124, respectively, have a coarse pitch and the first magnet gear 110 is a coarse pitch gear. Similarly, the second gear teeth 118 mesh with the fourth gear teeth 126 such that the main gear 108 also rotatably drives the second magnet gear 112 concurrently with the first magnet gear 110. As illustrated, the second and fourth gear teeth 118 and 126, respectively, have a fine pitch and the second magnet gear 112 is a fine pitch gear.

Thus, when the driver rotates the steering wheel, the main gear 108 also rotates and drives the first and second magnet gears 110 and 112, respectively. The first magnet gear 110 rotates at a first rate and the second magnet gear 112 rotates at a second rate different from the first rate. As such, when the steering wheel is rotated from completely leftward to completely rightward, or vice versa—i.e., the steering wheel is rotated from lock to lock the first magnet gear 110 rotates at a rate higher than the main gear 108 and the second magnet gear 112 also rotates at a rate higher than the main gear 108. As a non-limiting example, if the steering wheel is rotated three turns, the main gear 108 is rotated three turns (1080 degrees), the first magnet gear 110 is rotated twelve turns (4320 degrees) and the second magnet gear 112 is rotated thirteen turns (4680 degrees).

Positioned to rotate with the first magnet gear 110 is a first magnet 128. Similarly, a second magnet 130 is positioned to rotate with the second magnet gear 112. Unless otherwise noted, the description and illustration of one of the first and second magnets 128 and 130, respectively, also applies to the other of the first and second magnets 128 and 130, respectively. The first magnet 128 emits a first magnetic field that rotates as the first magnet 128 rotates with the first magnet gear 110. Similarly, the second magnet 130 emits a second magnetic field that rotates as the second magnet 130 rotates with the second magnet gear 112.

The first magnet 128 is fixed to rotate with the first magnet gear 110 and the second magnet 130 is fixed to rotate with the second magnet gear 112. As a non-limiting example, the first and second magnet gears 110 and 112, respectively, may be fabricated from a plastic material that is over molded onto the first and second magnets 128 and 130, respectively. The over molding of the plastic material on to the first and second magnets 128 and 130, respectively, fixes the first and second magnets 128 and 130, respectively, to rotate with the corresponding first and second magnet gear 110 and 112, respectively.

The ASAS assembly 100 further has a sensor assembly, indicated generally at 132. The sensor assembly 132 comprises a printed circuit board 134 upon which are first and second magnetic detection sensors 136 and 138, respectively. The first and second sensors 136 and 138, respectively, are connected by a data network to an electronic control unit (ECU). Each of the first and second sensors 136 and 138, respectively, may be paired with additional magnetic detection sensors to provide redundancy.

As a non-limiting example, the first and second sensors 136 and 138, respectively, may be Hall effect sensors. As a non-limiting example, the Hall effect sensors may be Melexis MLX90363 Triaxis Magnetometer IC's. Alternatively, the first and second sensors 136 and 138, respectively, may be giant magnetoresistance sensors, anisotropic magnetoresistance sensors, or fluxgate magnetometers.

The first and second sensors 136 and 138, respectively, are fixed in position relative to the first and second magnet gears 110 and 112, respectively. For example, the first and second sensors 136 and 138, respectively, may be fixed in position by being supported on the housing. The first and second sensors 136 and 138, respectively, are positioned to measure variations in the first and second magnetic fields.

Variations in the first magnetic field are measured by the first sensor 136. The first sensor 136 then outputs a first signal indicating the measurements of the first magnetic field. Similarly, the variations in the second magnetic field are measured by the second sensor 138 and the second sensor then outputs a second signal indicating the measurements of the second magnetic field.

The first signal may be used by the ECU to calculate a first position value—e.g., in degrees of rotation—of the first magnet gear 110. Similarly, the second signal may be used by the ECU to calculate a second position value—e.g., in degrees of rotation—of the second magnet gear 112. The first and second position values do not match or coincide within a measuring range of the ASAS assembly 100—i.e., the first and second position values are not equal. Thus, the first and second position values are used by the ECU in an algorithm to determine an absolute steering angle. The absolute steering angle corresponds to a position of the steering wheel.

As non-limiting examples, three algorithms for determining the absolute steering angle will be described.

A first algorithm determines the absolute steering angle by calculation. A first ratio of pitch diameters of the main gear 108 to the first magnet gear 110 and a second ratio of pitch diameters of the main gear 108 to the second magnet gear 112 are known for the ASAS assembly 100. As non-limiting examples, the first ratio may be 4:1 and the second ratio may be 4.23:1. Using as inputs the first ratio, the first position value for the first magnet gear 110, the second ratio, and the second position value for the second magnet gear 112, the first algorithm calculates the absolute steering angle.

A second algorithm determines the absolute steering angle by using a look up table. The look up table has unique ranges for the first and second position values corresponding to each value in an angular range of rotation for the steering wheel. The first and second position values are measured as previously described. The first and second position values are compared against the look up table to determine the only plausible angle range of positions for the main gear 108 (and the steering wheel). A relative angle is determined by a calculation based on the first position value and the first ratio and an absolute angle is determined by use of the relative angle and the plausible angle range from the look up table.

A third algorithm is an alternative calculation method to the first algorithm. The relative position is determined by a calculation using the first position value and the first ratio. A coarse absolute steering angle is based on a calculation of the first and second position values (as per the first algorithm). The final calculated absolute steering angle position is calculated using the relative angle measurement determined from the first magnet gear 110 and the coarse absolute steering angle calculation.

Alternatively, the structure of the ASAS assembly 100 may be used with algorithms other than those described to calculate the absolute steering angle.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. An absolute steering angle sensor assembly comprising:
   a single main gear, wherein the main gear has first gear teeth with a first pitch, second gear teeth with a second pitch, and the first and second gear pitches are different;
   a first magnet gear driven by the first gear teeth, wherein the first magnet gear has a first gear profile and a first diameter;

a second magnet gear driven by the second gear teeth, wherein the second magnet gear has a second gear profile and a second diameter, the first and second gear profiles are different, and the first and second diameters are different;

wherein at least one of the first and second magnet gears engages into the single main gear with an anti-backlash gear, the at least one of the magnet gears and the anti-backlash gear being elastically biased relative to each other around a joint central axis to reduce play between the at least one magnet gear and the single main gear;

a first magnet rotating with the first magnet gear and emitting a first magnetic field;

a second magnet rotating with the second magnet gear and emitting a second magnetic field; and a sensor assembly measuring strengths of the first and second magnetic fields and calculating an absolute steering angle.

* * * * *